US008924413B2

(12) United States Patent
Jin (10) Patent No.: US 8,924,413 B2
(45) Date of Patent: Dec. 30, 2014

(54) MEDIA CONTENT SEARCHING (75) Inventor: Zhiying Jin, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 220 days.

(21) Appl. No.: 13/313,125

(22) Filed: Dec. 7, 2011

(65) Prior Publication Data

US 2013/0151548 A1 Jun. 13, 2013

(51) Int. Cl.
*G06F 17/30* (2006.01)
(52) U.S. Cl.
CPC ................ *G06F 17/30038* (2013.01)
USPC .......................... 707/769; 707/736
(58) Field of Classification Search
CPC .............................. G06F 17/30038
USPC ................................ 707/769, 736
See application file for complete search history.

(56) References Cited

U.S. PATENT DOCUMENTS

| 2005/0027687 A1* | 2/2005 | Nowitz et al. ............ 707/3 |
| 2005/0076017 A1* | 4/2005 | Rein et al. ............... 707/3 |
| 2006/0010472 A1* | 1/2006 | Godeny ................... 725/62 |
| 2008/0307456 A1* | 12/2008 | Beetcher et al. ........ 725/38 |
| 2009/0106202 A1* | 4/2009 | Mizrahi .................. 707/3 |

* cited by examiner

*Primary Examiner* — Jensen Hu

(57) ABSTRACT

A method may include receiving, from a user device, a search query associated with identifying media content available from a service provider. The method may also include accessing a table including entries storing metadata associated with media content, wherein the table includes a key word field and at least some of the entries include key words/terms stored in the key word field. The method may further include identifying a first entry in the table based on a word/term in the search query matching metadata stored in the first entry, determining whether a word in the search query matches a word in the key word field of the first entry and providing a search result identifying a first media content corresponding to the first entry, in response to determining that a word in the search query matches a word in the key word field of the first entry.

20 Claims, 6 Drawing Sheets

400

| | TITLE 402 | CASTING INFO 404 | DIRECTOR 406 | PRODUCER 408 | DESCRIPTION 410 | KEY WORDS 412 | GENRE 414 |
|---|---|---|---|---|---|---|---|
| 420-1 | NIGHTMARE 3 | BILL SMITH | JANE DOE | KEN JONES | THIS HORROR EPIC ..... | FEAR HORROR TERROR... | HORROR |
| 420-2 | TV TUTORIAL & FEATURES | | | | HELP AND INFORMATION .... | | |
| 420-3 | .... | ... | ... | .... | THIS ADULT MOVIE .... | ADULT SEX NUDITY... | ADULT |
| 420-4 | .... | .... | .... | .... | THIS ANIMATED MOVIE INCLUDES SILLY... | FUNNY SILLY ANIMATED.... | CHILDREN |
| 420-N | . . . | . . . | . . . | . . . | . . . | . . | . . |

MEDIA CONTENT SEARCHING

BACKGROUND INFORMATION

Television service providers typically allow customers to search for content, such as programming content, video on demand (VOD) content, etc. However, due to limitations associated with the typical content search tool and the television interface, discovering content of interest is often difficult. As a result, customers often bypass using the search tool provided by the service provider.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to searching for programming content. In an exemplary implementation, the service provider may store information associated with metadata provided with the available content, such as a title, a director/producer, actors, a description of the content, a genre, etc. The service provider may also identify and store key words or terms associated with certain genres or types of content. When a user provides a search query, the search engine searches the stored information and determines if the search query matches one of the terms in the description portion of the metadata. If an entry includes a matching word/term, the search engine checks the stored key words to determine if the search term also matches a key word/term. If the search query does not match a key word/term for a particular item of content, the search engine may disregard the particular item of content when providing search results. In this manner, the search engine may essentially disassociate content that includes metadata that matches one or more terms in a search query, but is otherwise not relevant to the user's search query.

Figure 1:
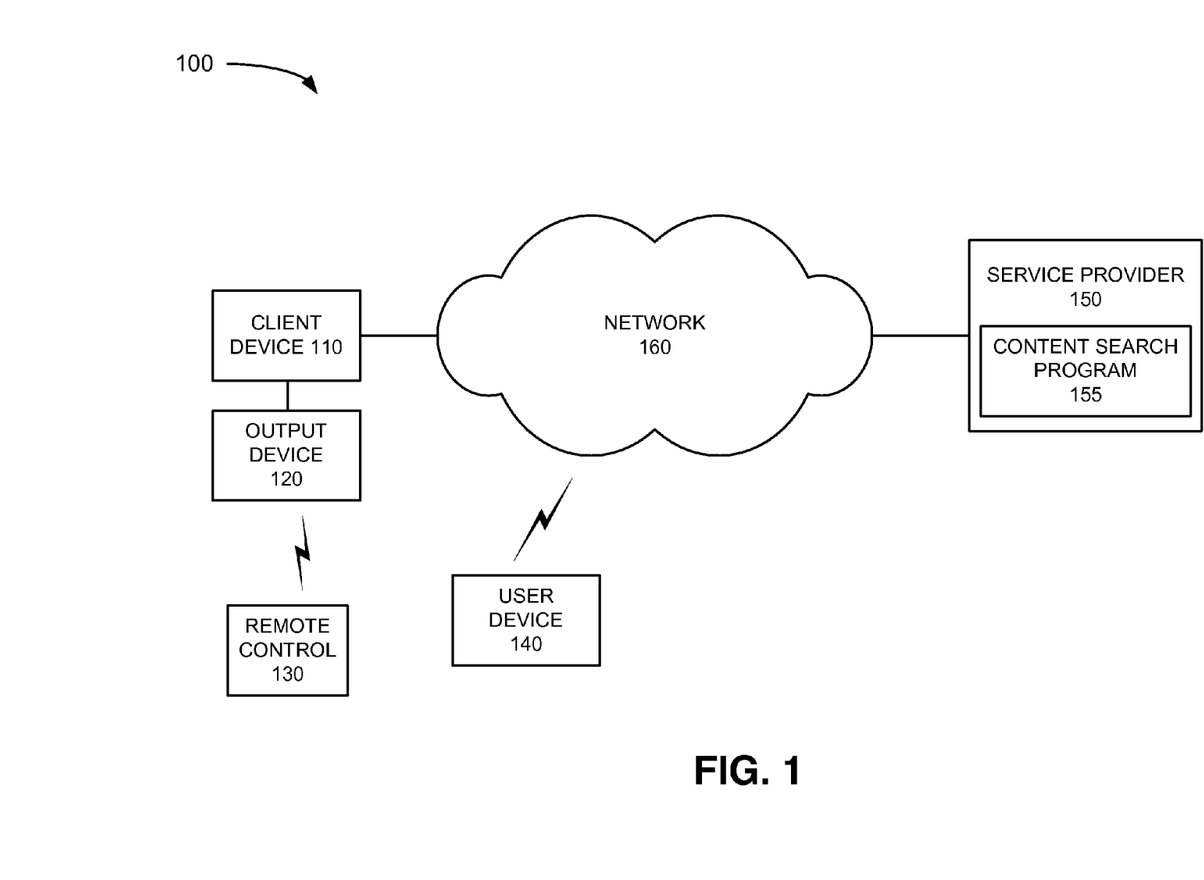
FIG. 1 illustrates an exemplary network in which systems and methods described herein may be implemented.

FIG. 1 is a block diagram of an exemplary network 100 in which systems and methods described herein may be implemented. Network 100 may include client device 110, output device 120, remote control 130, user device 140, service provider 150 and network 160.

Client device 110 may include any type of device that is able to receive data, such as text data, video data, image data, audio data, multi-media data, etc., transmitted from a source, such as service provider 150. Client device 110 may decode the data and output the data to an output device, such as output device 120, for viewing or playing. In an exemplary implementation, client device 110 may include a set top box (STB) used to decode incoming multi-media data, such as multi-media data received from a television service provider, a cable service provider, a satellite system, a wireless system or some other wired, wireless or optical communication medium. The term "set top box" as used herein should be construed to include any device used to receive signals from an external source and output the signals for viewing or playing. In some implementations, client device 110 may forward the decoded data for viewing or playing by another device, such as output device 120. In other implementations, client device 110 may play and display the decoded media.

For example, in some implementations, client device 110 may include some type of computer, such as a personal computer (PC), laptop computer, home theater PC (HTPC), etc., that is able to receive incoming data and decode the incoming data for output to a display, which may be included with client device 110. In this instance, a client device 110 may include logic, such as a cable card, television card or other logic, to interface with service provider 150.

Output device 120 may include any device that is able to output/display various media, such as a television, monitor, PC, laptop computer, HTPC, a personal digital assistant (PDA), a web-based appliance, a mobile terminal (e.g., a cellular phone, a smart phone), etc. In an exemplary implementation, output device 120 may receive multi-media data from client device 110 and display or play the media.

Remote control 130 may include a device that allows a user to control programming (e.g., change channels) and/or content displayed on a television/output device via interaction with client device 110, such as via infrared (IR) signaling. Remote control 130 may also allow a user to search for various content provided by service provider 150, as described in detail below.

User device 140 may include a laptop computer, a tablet computer, a notebook computer, a PC, an ultra mobile personal computer (UMPC), a netbook, a game-playing device/console, or other types of computation or communication devices, threads or processes running on these devices, and/or objects executable by these devices. User device 140 may also include any type of communication device, such as a personal digital assistant (PDA) that can include a radio, a mobile telephone (e.g., a cell phone), a smart phone (e.g., that may combine a cellular radio with data processing and data communications capabilities), etc. In one implementation, user device 140 may include any device (e.g., an Internet Protocol (IP)-based device) that is capable of communicating via a network to request content. User device 140 may also be configured to interact with and connect to other devices in network 100 devices (e.g., client device 110, output device 120 and/or a home router (not shown) via a local network (e.g., a home wired or wireless network). For example, user device 140 may connect to client device 110 and act as a remote control with respect to programming provided by client device 110, enter a search query to client device 110, etc. User device 140 may connect to network 160 via wired, wireless, or optical connections.

Service provider 150 may include one or more computing devices/systems, servers and/or backend systems that are able to connect to network 160 and transmit and/or receive information via network 160. In one implementation, service provider 150 may include a server (e.g., a computer system or an application), a cable head-end, and/or a broadcaster capable of providing content (e.g., TV programming, movies, video on demand (VOD) services, live television, news feeds, blog feeds, widgets, applications, etc.), advertisements, instructions, codes, encryption keys, and/or other information associated with products and/or services, etc., to client device 110 and user device 140.

Service provider 150 may also include content search program 155. In an exemplary implementation, content search program 155 may allow a user to search for content provided by service provider 150. For example, users may access content search program 155 via interaction with remote control 130 and/or user device 140 and search for content, as described in more detail below.

Network 160 may include one or more wired, wireless and/or optical networks that are capable of receiving and transmitting data, voice and/or video signals, including multimedia signals that include voice, data and video information. For example, network 160 may include one or more public switched telephone networks (PSTNs) or other type of switched network. Network 160 may also include one or more wireless networks and may include a number of transmission towers for receiving wireless signals and forwarding the wireless signals toward the intended destinations. Network 160 may further include one or more satellite networks, one or more packet switched networks, such as an Internet protocol (IP) based network, a local area network (LAN), a wide area network (WAN), a personal area network (PAN) (e.g., a wireless PAN), an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, although one client device 110, one output device 120, one remote control 130, one user device 140, one service provider 150 and one network 160 have been illustrated in FIG. 1, in practice, there may be more client devices 110, output devices 120, remote controls 130, user devices 140, service providers 150 and/or networks 160. Network 100 may also include additional elements, such as switches, gateways, routers, backend systems, etc., that aid in routing information, such as content or information from service provider 150 to client devices 110, output devices 120, remote control 130 and user device 140.

Further, various functions are described below as being performed by particular components in network 100. In other implementations, various functions described as being performed by one device may be performed by another device or multiple other devices, and/or various functions described as being performed by multiple devices may be combined and performed by a single device.

Figure 2:
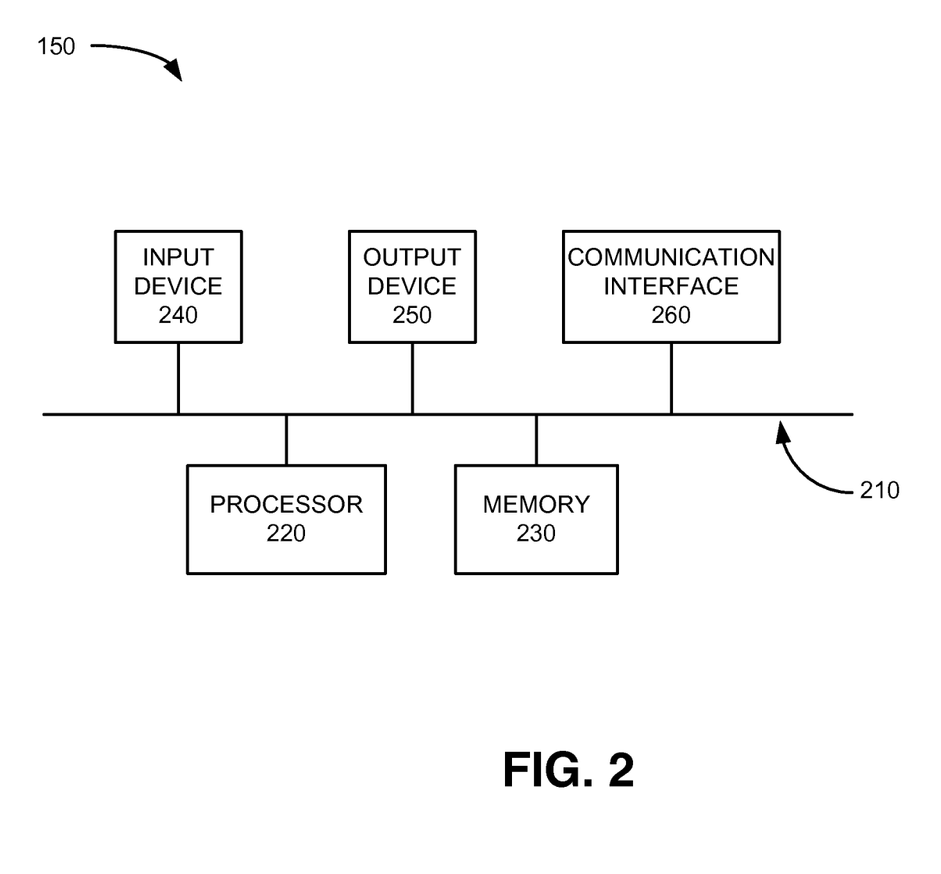
FIG. 2 illustrates an exemplary configuration of one or more of the devices of FIG. 1.

FIG. 2 illustrates an exemplary configuration of service provider 150. Other devices in network 100, such as client device 110, output device 120, remote control 130 and user device 140 may be configured in a similar manner. Referring to FIG. 2, service provider 150 may include bus 210, processor 220, memory 230, input device 240, output device 250 and communication interface 260. Bus 210 may include a path that permits communication among the elements of service provider 150.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information to service provider 150, such as a keyboard, a keypad, a mouse, a pen, a microphone, a touch screen, voice recognition and/or biometric mechanisms, etc. Output device 250 may include a mechanism that outputs information to the user, including a display, a printer, a speaker, etc.

Communication interface 260 may include a transceiver that service provider 150 (or client device 110, output device 120, remote control 130 or user device 140) may use to communicate with other devices via wired, wireless or optical mechanisms. Communication interface 260 may also include one or more radio frequency (RF) transmitters, receivers and/or transceivers and one or more antennas for transmitting and receiving RF data via network 160. Communication interface 260 may also include a modem or an Ethernet interface to a LAN or other mechanisms for communicating with elements in a network, such as network 160 or another network.

The exemplary configuration illustrated in FIG. 2 is provided for simplicity. It should be understood that service provider 150 (or client device 110, output device 120, remote control 130 or user device 140) may include more or fewer devices than illustrated in FIG. 2. In an exemplary implementation, service provider 150 (or client device 110, output device 120, remote control 130 or user device 140) may perform operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
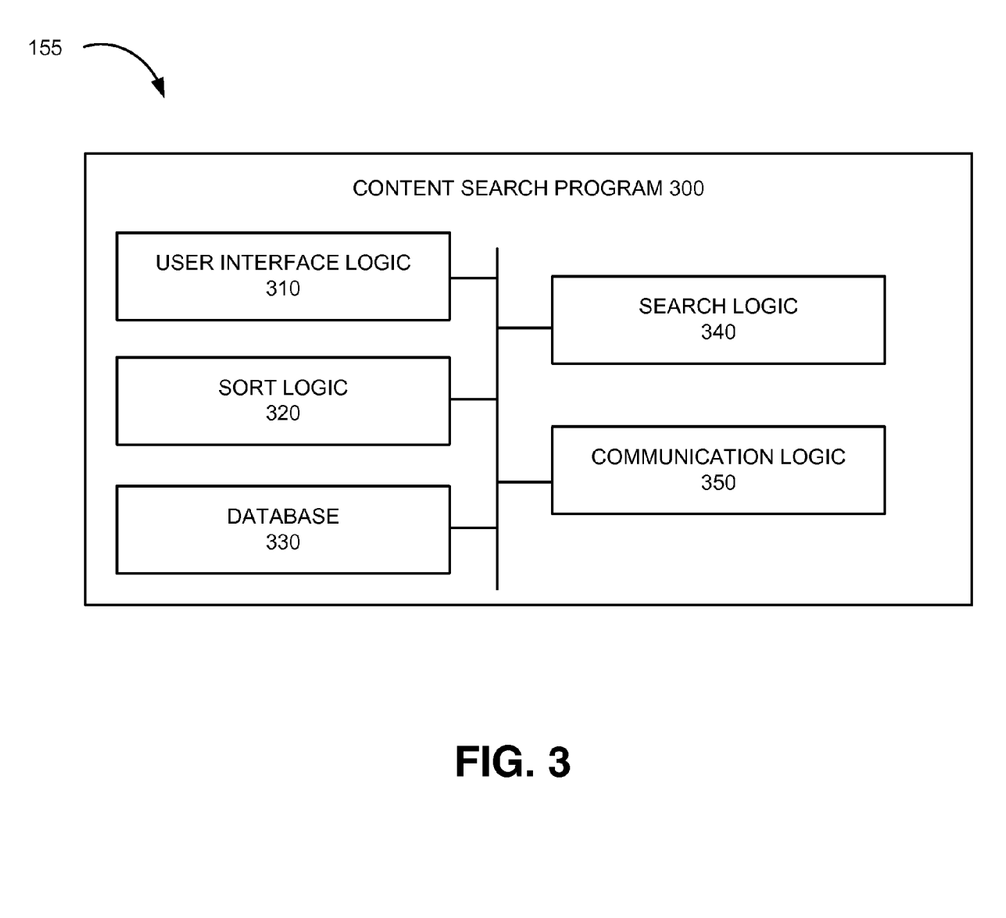
FIG. 3 illustrates an exemplary configuration of logic components implemented in the content search program of FIG. 1.

FIG. 3 illustrates an exemplary configuration of logic components implemented in content search program 155 of FIG. 1. In an exemplary implementation, all or some of the components illustrated in FIG. 3 may be stored in memory 230 and executed by processor 220. Referring to FIG. 3, content search program 155 may include user interface logic 310, sort logic 320, database 330, search logic 340 and communication logic 350. Content search program 155 and its various logic components are described as being included in service provider 150. In alternative implementations, these components or a portion of these components may be located externally with respect to service provider 150. For example, in some implementations, one or more of the components of content search program 155 may be located in or executed by client device 110, output device 120, remote control 130 or user device 140.

User interface logic 310 may include logic to provide a user with an interface to enter information associated with identifying content and/or information of interest. For example, user interface logic 310 may include a graphical user interface (GUI) that allows a user to easily enter information, via remote control 130 or user device 140, to search for content and information, such as on-demand content, television programs, including tutorials provided by service provider 150 associated with ordering content, programming channel listings, setting a digital video recorder (DVR), etc.

Sort logic 320 may include logic associated with sorting content and information that is available from service provider 150. Sort logic 320 may sort content and information in accordance with metadata included with the content. As an example, the metadata associated with programming content may include a title, casting information, a producer, a director, a description, a duration and a genre. In an exemplary implementation, sort logic 320 may identify words/terms that are frequently used in the description portion of the metadata for particular genres or types of content (e.g., adult content, horror/scary content, violent content) and classify these identified words as key words or terms. Sort logic 320 may also store the key words/terms in database 330 based on the frequency of use, as described in more detail below.

Figure 4:
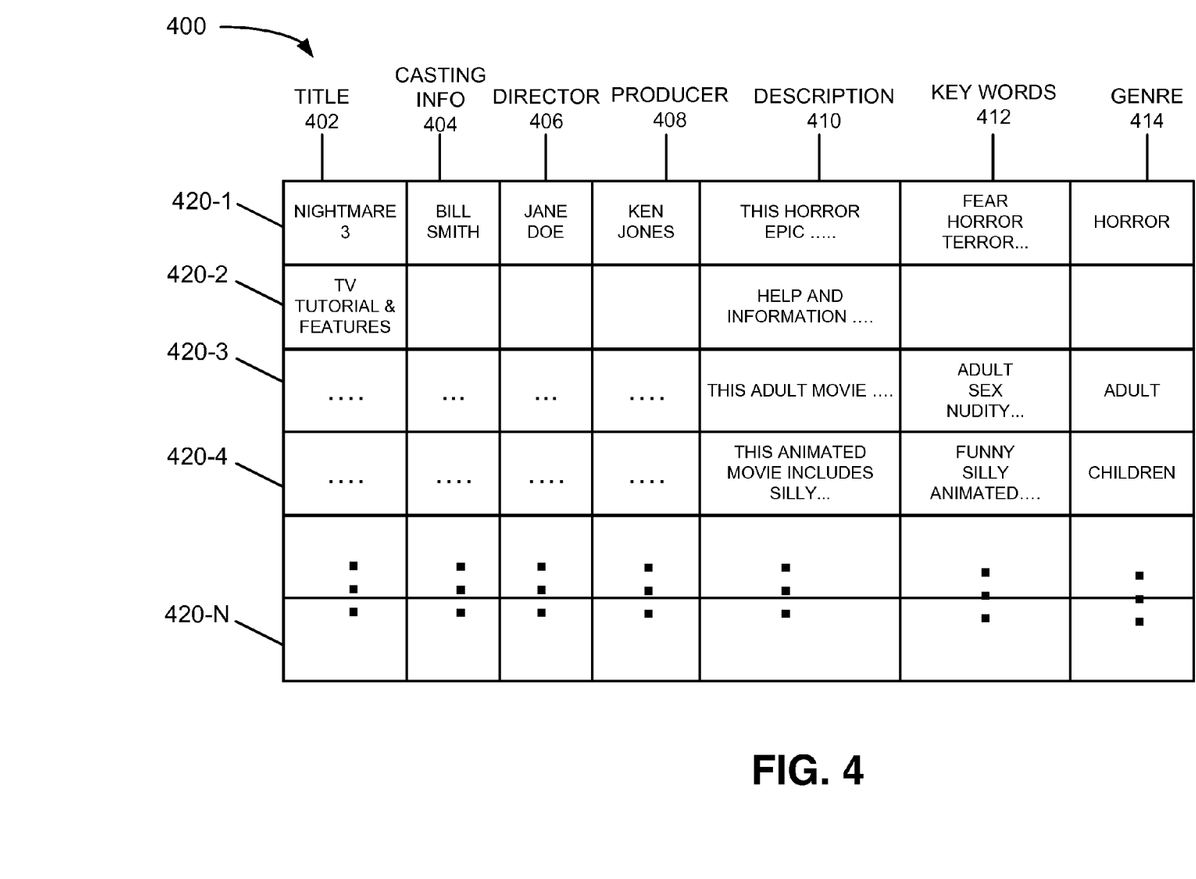
FIG. 4 illustrates an exemplary table used by the content search program of FIG. 3.

Database 330 may include one or more databases/tables of information identifying programs and other content available to users (also referred to herein as customers). For example, database 330 may include a table that stores metadata associated with each item of available content. As an example, FIG. 4 illustrates an exemplary table 400 stored in database 330. Referring to FIG. 4, table 400 includes title field 402, casting information field 404, director field 406, producer field 408, description field 410, key words field 412 and genre field 414. In other implementations, table 400 may include additional fields and/or other fields.

Title field 402 may include the title of the content, such as the movie title, television show title, tutorial title/subject, etc. Casting information field 404 may include information identifying the cast (e.g., the lead actors/actresses). Director field 406 may identify the director of the program and producer field 408 may identify the producer of the program. Description field 410 may include a brief description of the content. Key words field 412 may include key words that are frequently used in the description associated with particular genres/types of content. As described above, in an exemplary implementation, sort logic 320 may identify the key words/terms and store the key words based on frequency of use in key words field 412, as described in more detail below. Genre field 414 may include a genre associated with the program, such as horror, adult, comedy, children, etc.

Referring back to FIG. 3, search logic 340 may include logic for identifying content based on a search query provided by the user. For example, search logic 340 may receive a search query via user interface logic 310, access table 400 to search for the appropriate information and provide search results to the user via user interface logic 310. In an exemplary implementation, search logic 340 may search key words field 412 associated with particular types of genre/content, such as adult, horror, violent, etc., to identify whether one or more terms in a search query match one or more terms in key words field 412, as described in detail below.

Communication logic 350 may include logic for communicating with other devices in network 100. For example, communication logic 350 may receive a search query via user interface logic 310 and forward the search query to search logic 340. Communication logic 350 may also forward search results generated by search logic 340 to the customer, as described in more detail below.

Figure 5:
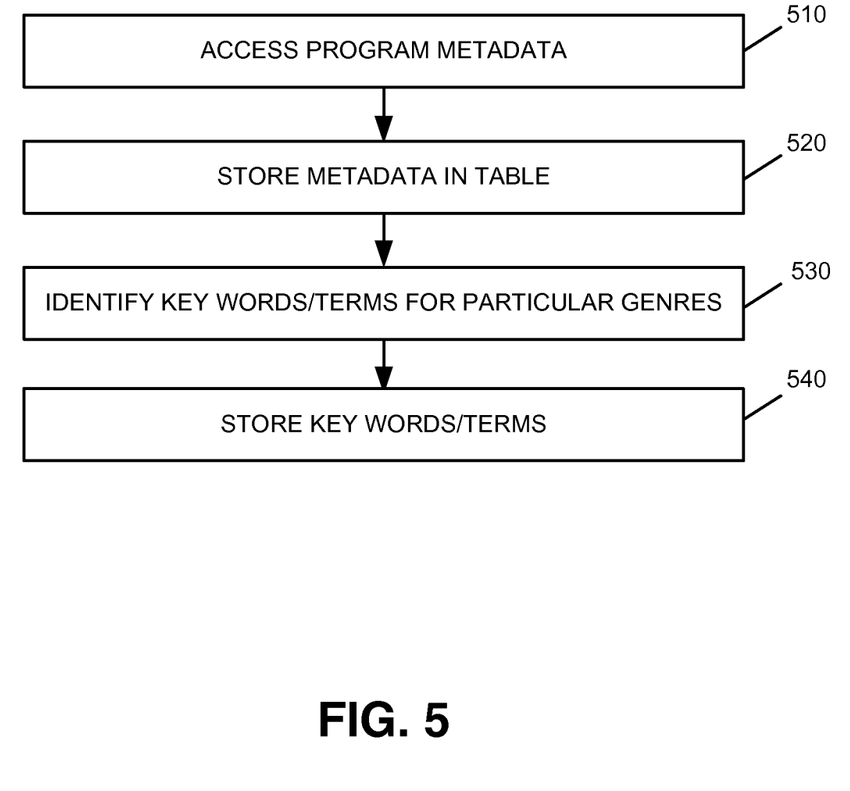
FIG. 5 is a flow diagram illustrating exemplary processing associated with storing information in the table of FIG. 4 in accordance with an exemplary implementation.

FIG. 5 is a flow diagram illustrating exemplary processing associated with storing metadata by service provider 150. Processing may begin with sort logic 320 access accessing a listing of programs and information available from service provider 150. The terms "programs" and "media content," as used herein, should be construed to include all content available to customers from service provider 150, such as movies, television shows, tutorials, widget instructions, etc. Sort logic 320 may access the metadata associated with the programs (block 510). Sort logic 320 may store the metadata in the appropriate fields in table 400 (block 520). For example, as illustrated in entry 420-1 in table 400, sort logic 320 may store the title, casting information, director, producer, description and genre associated with a movie entitled "Nightmare 3" in fields 402, 404, 406, 408, 410 and 414, respectively.

As also illustrated in entry 420-2, sort logic 320 may store the title and description associated with a TV tutorial in fields 402 and 410, respectively. In entry 420-2, fields 404, 406, 408 and 414 may not include information since the program is a tutorial on how to use various features provided by service provider 150 and the information corresponding to fields 404, 406, 408 and 414 may not exist and/or may not be relevant. Sort logic 320 may store relevant information for all other available content in entries 420-3 through 420-N in a similar manner in table 400.

Sort logic 320 may also access the description information stored in field 410 for particular genres of content and identify key words or terms frequently used in the descriptions for the particular genres (block 530). As an example, sort logic 320 may identify the horror genre as being a genre in which key words will be identified. In this case, sort logic 320 may search the metadata descriptions associated with a large number of horror movies (e.g., 100 movies, 500 movies, etc.) to identify the key words/terms.

In this example, assume that sort logic 320 identifies a predetermined number of the terms most commonly used in the description metadata for horror movies, such as ten predetermined terms. Sort logic 320 may skip words, such as a, an, the, is, etc., when searching for the most commonly used terms. Sort logic 320 may store the ten key words/terms in key word field 412 for each entry of the horror genre (block 540). For example, entry 420-1 stores information associated with the movie "Nightmare 3," which is identified in genre field 414 as a horror movie. Therefore, sort logic 320 may store the identified key words/terms in key word field 412 of entry 420-1. In this case, assume that sort logic 420 identified the following key words: fear, horror, terror, terrifying, scary, violence, gory, bloody, scream and monster. Sort logic 420 may store these terms in field 412 of entry 420-1, as illustrated in FIG. 4, as well as store these terms in field 412 of all other entries in the horror genre.

In an exemplary implementation, sort logic 320 may also store the key words in an order based on the frequency of use. For example, the most frequently used word/term used in the horror genre descriptions may be "fear." Therefore, the word fear may be stored first, followed by the nine most frequently used words in descending order based on frequency of use. In some implementations, search logic 340 may determine an order associated with search results provided to a customer based on the particular word/term in key word field 412 that matches a search query. For example, if a term in a search query matches the key word "fear" in a first entry, search logic 340 may rank the first entry higher in the listing of search results than other matches for non-horror genre entries, as described in more detail below.

Sort logic 320 may identify, sort and store the key words/terms for the other genres/types of content, such as the adult genre, violent/action genre, children's genre, etc., in a similar manner. For example, sort logic 320 may identify key words in the adult genre, such as adult, sex, nudity, etc. Sort logic 320 may store these key words in key word field 412 for each entry in table 400 in the adult genre, such as entry 420-3 illustrated in FIG. 4. The information stored in table 400 may then be used by search logic 340 in response to a search query from a user, as described in detail below.

Figure 6:
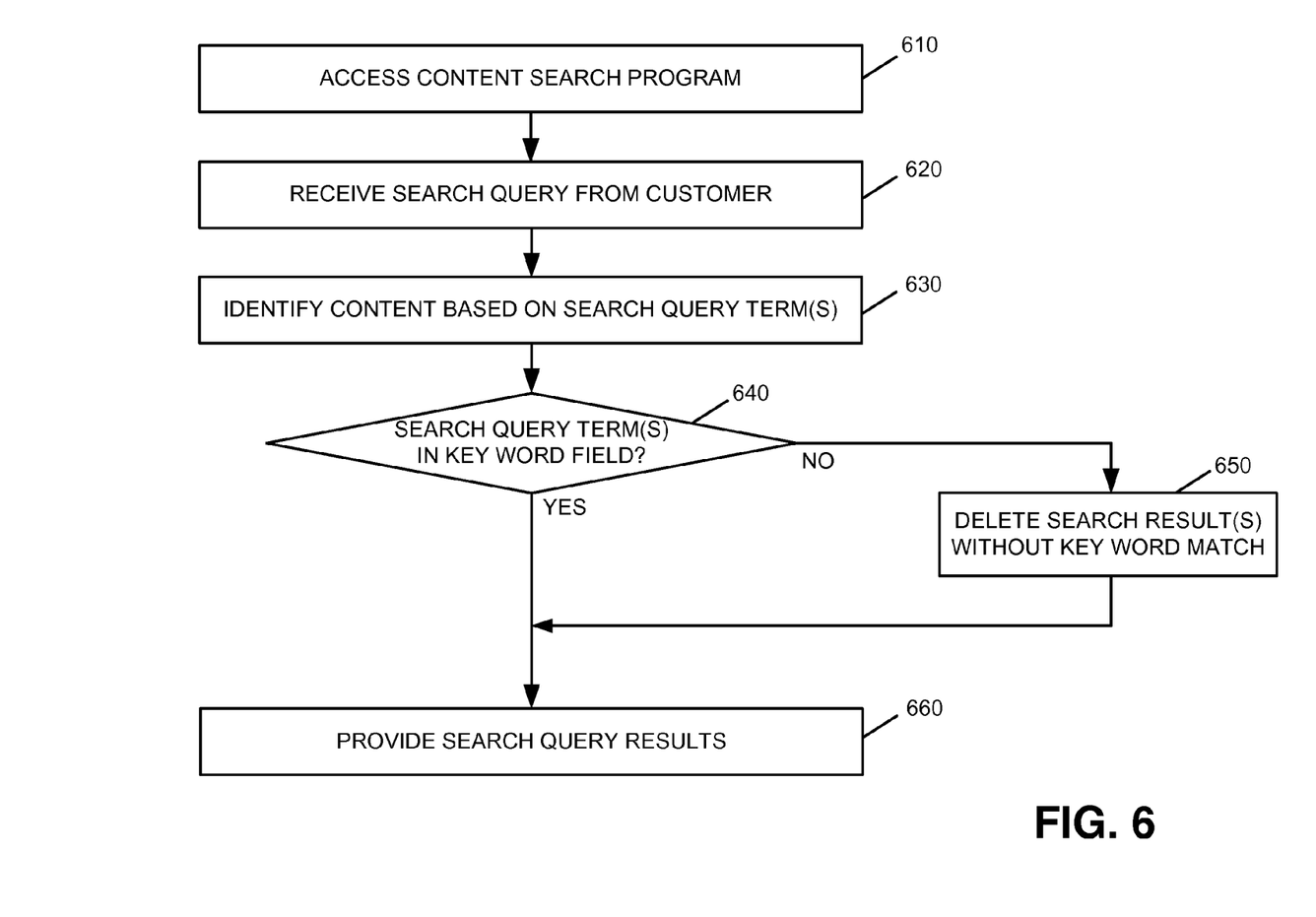
FIG. 6 is a flow diagram illustrating exemplary processing by various components of FIG. 1 in accordance with an exemplary implementation.

FIG. 6 is a flow diagram illustrated exemplary processing associated with searching for content. Processing may begin with a customer at remote control 130 interfacing with output device 120 (e.g., a TV) and/or client device 110 to access or launch content search program 155 (block 610). Alternatively, the customer may use user device 140 to access content search program 155.

In either case, after accessing or launching content search program 155, the user may interact with content search program 155 to provide a query identifying what type of information the customer is trying to locate. For example, user interface logic 310 may provide a GUI that includes input boxes for the user to request information of interest. The user, via a keypad or control keys on remote control 130 (or user device 140), may interact with the GUI to enter information identifying the type of requested information. In this example, assume that the user would like to obtain information associated with learning more about programming the digital video recorder (DVR), that is included within client device 110, via remote control 130. Therefore, assume that the user enters the search query "remote DVR."

Search logic 340 receives the search query (block 620). Search logic 340 also accesses table 400 to identify content based on one or more terms in the search query (block 630). For example, assume that service provider 150 provides customers with access to a TV/DVR tutorial program on how to program the DVR that includes the following description "Help and information about your TV service includes tutorials on your TV listings, DVR, parental controls, Media Manager, Widgets, Remote Control and Set Top Boxes." Also assume that sort logic 320 stored information associated with the TV/DVR tutorial in entry 420-2 of table 400. Further assume that service provider 150 provides VOD content for a horror movie entitled "Nightmare 3" with a description that includes the following: "This horror epic includes a scene so unbelievable that you will be reaching for your DVR remote to replay this over and over." In this case, sort logic 320 may have previously stored this information in field 410 of entry 420-1 of table 400. Sort logic 320 may have also previously identified key words associated with the horror genre and stored the key words in key word field 412 of entry 420-1, as described above. That is, assume that sort logic 320 identified and stored the key words fear, horror, terror, terrifying, scary, violence, gory, bloody, scream and monster in key words field 412 of entry 420-1, as illustrated in FIG. 4.

Search logic 340 may search table 400 based on the search query "DVR remote" and identify the content associated with entries 420-1 and 420-2 as including one or more of the search terms. Search logic 340 may also determine, for each of the matches, whether one or more of the search query terms are included in key words field 412 (block 640).

For example, as illustrated in field 412 of entry 420-1, sort logic 320 did not identify and store the terms "DVR" and/or "remote" as key words/terms since each of the words/terms "DVR" and "remote" is not frequently used in descriptions associated with programs in the horror genre. In this case, search logic 340 determines that no terms of the search query are included in key word field 412 for an entry (i.e., entry 420-1) in which a match was identified (block 640—no). Search logic 340 may then delete the search result (or not include the search result with search results provided to the customer) associated with the movie "Nightmare 3" since none of the words in key word field 412 of entry 420-1 match words/terms in the search query (block 650).

Search logic 340, however, may provide the search results associated with other ones of the media content that matched the search query (block 660). Continuing with this example, search logic 340 may output information identifying content associated with entry 420-2 to the customer. In this case, key word field 412 of entry 420-2 may be empty. In an exemplary implementation, an empty key word field 412 may indicate that the key words/terms are not relevant for the particular type of content. For example, in one implementation, key words/terms may be provided for particular genres of content, such as horror, adult, violent, children, etc. but not for other genre's, such as family, comedy, tutorials or informational type of programs provided by service provider 150. Therefore, in this example, search logic 340 may forward information, via communication logic 350, identifying the TV tutorial corresponding to entry 420-2 to the customer. The customer may then select, via remote control 130 or user device 140, the tutorial for playing.

If, however, search logic 340 identifies that one or more terms in the search query match one or more terms in keywords field 412 (block 640—yes), search logic 340 may include that identified media content with the other identified media content (block 660). As an example, if a search query provided by the customer is "horror classic," search logic 340 will identify entry 420-1 in the search results, since the term "horror" is included in key word field 412 of entry 420-1.

In this manner, content search program 155 may "disassociate" metadata or other information identified in table 400 from terms in a search query using key word field 412. As a result, a search query in which one or more words otherwise matches metadata associated with content will be ignored when providing search results since a match to a term in a description associated with a program may not always provide a good indication that the "match" will be relevant to the customer's search query. For example, in the example above, the customer searching "DVR remote" was most likely not searching for a horror movie. Therefore, disassociating the content for the horror movie identified in entry 420-1 from the query "DVR remote" by using key word field 412 may result in more relevant search results for the customer. In addition, disassociating terms in description field 410 via key words field 412 may also avoid a customer from obtaining search results that identify unsuitable content (e.g., adult content, scary or violent content, etc., that may be offensive to some customers).

In the scenario described above, search logic 340 disassociated otherwise matching entries in table 400 based on lack of corresponding terms in key words field 412. In some implementations, such key word disassociation applies to descriptions only. That is, if a search query matches a word/name in title field 402, casting information field 404, director field 406, producer field 408 or genre field 414, then search logic 340 provides the corresponding search results and does not check keyword field 412. For example, if the search query includes the name "Alfred Hitchcock" and director field 406 for one of entries 420 includes the name Alfred Hitchcock, information associated with that entry will be provided to the customer.

In the scenario described above, search logic 340 eliminated search results associated with a horror movie (e.g., entry 420-1) in which search terms were not included in key words field 412 to avoid providing irrelevant search results. Similar methodology may apply to other types of content/genres, such as adult movies, violent action movies, etc. For example, field 412 of entry 420-3 includes the terms "adult," "sex" and "nudity," etc., and field 414 of entry 420-3 identifies the genre as "adult." In this case, if a search query term happens to match one of the words/terms in description field 410, but does not match one of the key words/terms "adult," "sex," "nudity," etc., search logic 340 will determine that the user was not searching for content of the adult genre and will eliminate/not provide the "match" associated with entry 420-3 from the search results provided to the customer.

In another implementation, content search program 155 may dissociate keywords by grouping search results based on the genres/type of content that are identified and eliminate certain ones of the search results based on the genre/type of content that is identified. As an example, assume that search logic 340 initially identifies ten movies based on a search query, where seven of the matches are in the "children" genre, two of the matches are in the "sports" genre and one of the matches is in the "adult" genre. In this implementation, search logic 340 may eliminate the last match (i.e., the adult movie) since no other movies in the adult genre were identified. That is, search logic 340 may store a threshold that requires, for example, that a certain number (e.g., two results) or a certain percentage (e.g., twenty percent) of matches have the same genre. In this example, since only one match was in the adult genre, search logic 340 determines that since the number of matches in the adult genre did not meet the threshold number (e.g., two) or the threshold percentage (e.g., 20%), that the adult movie should not be provided with the other search results. In this case, search logic 340 only provides the seven matches in the children's genre and the two matches in the sports genre to the customer.

In still another implementation, search logic 340 may take into consideration the time of day and/or day of the week when identifying relevant media content. For example, from 8:00 AM to 11:00 AM on Saturday, search logic 340 may not perform key word disassociation for matches associated with the children's genre, if terms of the search query match information in the description field 410. That is, search logic 340 may bypass searching keyword field 412 for content identified as children's content during the hours of 8:00 AM to 11:00 AM on Saturday since it is likely that a customer may be searching for children's content at that time/day.

Similarly, search logic 340 may not apply keyword disassociation from 11:00 PM until 4:00 AM for matches associated with the adult genre. That is, search logic 340 may bypass searching keyword field 412 for the adult genre when a match is identified in description field 410 since it is likely that a customer may be searching for adult content at that time of day.

In some implementations, search logic 340 may combine the key word disassociation described above with respect to FIGS. 4-6 with one or both of the content genre grouping disassociation and time-based disassociation described above. This may provide for further tailoring of search results that are likely to be relevant to the customer.

In some implementations, search logic 340 may determine an order associated with search results provided to a customer based on the particular word/term in key word field 412 that matches a search query. For example, assume that the search query is "scary night." In this case, assume that a search result identifies a horror genre entry which includes the word scary in description field 410 and also includes the word scary in key word field 412. Further assume that search logic 340 identifies an entry of a non-horror genre (e.g., a nature genre movie) having the term "night" in description field 412. In this case, search logic 340 may list the horror genre content higher in the list of search results than the nature genre content. That is, a match that includes a matching key word may result in a higher ranking than a match without a corresponding key word match.

Implementations described herein relate to searching for programming content. As described above, a service provider may identify and store key words or terms associated with available content. The service provider may then determine whether one or more terms in a search query matches one of the key words/terms. This may allow a user to receive search results that are more likely to be relevant to the use's search query.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to search logic 340 searching table 400 for words/terms in a search query that match metadata associated with the content (e.g., metadata in one of fields 402, 404, 406, 408, 410 and 414), followed by searching key word field 412. In other implementations, search logic 340 may search key word field 412 for entries in which key words are included concurrently with the other searching associated with fields 402, 404, 406, 408, 410 and 414.

Further, features have been described above with respect to identifying key words in a description associated with the content. In other implementations, search logic 340 may identify a relevance factor based on a location within the description. For example, if a search term is located in the beginning portion of the description, that "match" may be considered more relevant than a match in which the key word is located at a later or end portion of the description. For example, assume that the last line of a description includes the following: "This football game was so amazing that you will want to save it on your DVR." In this case, if the search query was "DVR remote," search logic 340 may list this search result at the end of the search results, or not include this search result with the other search results, since the term "DVR" is included at/near the end of the description.

Further, while series of acts have been described with respect to FIGS. 5 and 6, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
receiving, from a user device, a search query associated with identifying media content available from a service provider;
accessing a table including a plurality of entries storing metadata associated with a plurality of media content, wherein the table includes a key word field storing key words or terms that are frequently used in descriptions of media content and wherein at least some of the plurality of entries include key words or terms stored in the key word field;
identifying a first entry in the table based on a word or term in the search query matching metadata stored in the first entry;
determining whether at least one word in the search query matches a word in the key word field of the first entry;
providing a search result identifying a first media content corresponding to the first entry, in response to determining that at least one word in the search query matches a word in the key word field of the first entry;
providing a search result that does not identify the first media content, in response to determining that no word in the search query matches a word in the key word field of the first entry;
identifying the key words or terms in a description portion of the metadata for multiple entries in the table having a first genre; and
storing the identified key words or terms in the key word field for the multiple entries having the first genre.

2. The method of claim 1, wherein the identifying the key words or terms includes:
identifying a predetermined number of most frequently used words or terms associated with descriptions of media content having the first genre.

3. The method of claim 2, wherein the first genre comprises one of an adult genre, a horror genre or a violence genre.

4. The method of claim 1, further comprising:
receiving, from the user device, a second search query;
determining at least one of a time of day or a day of the week in which the second search query was received; and
identifying a second entry in the table based on a word or term in the second search query matching metadata stored in the second entry; and
not checking the key word field of the second entry based on at least one of the time of day or the day of the week.

5. The method of claim 1, further comprising:
receiving from the user device, a second search query;
identifying a second entry in the table based on a word or term in the second search query matching metadata stored in the second entry;
identifying a genre or type of content associated with the first second entry; and
not checking the key word field of the second entry based on the identified genre or type of content.

6. The method of claim 1, further comprising:
receiving a second search query;
identifying multiple entries in the table based on the second search query, the multiple entries including a second entry;
determining whether a genre associated with the second entry matches a genre associated with at least an other one of the multiple entries; and
providing a second search result that does not include the second entry, in response to determining that a genre associated with the second entry does not match a genre associated with at least the other one of the multiple entries.

7. A system, comprising:
a memory configured to store a database that includes metadata associated with a plurality of media content and a key word field, wherein at least some of a plurality of entries in the database include at least one key word or term stored in the key word field; and
at least one processor configured to:
identify key words or terms in a description portion of the metadata for multiple entries in the database having a first genre,
store the identified key words or terms in the key word field for each of the multiple entries having the first genre,
receive, from a user device, a search query associated with identifying media content available from a service provider,
identify a first entry in the database based on the search query by matching at least one word or term in the search query to a word or term in the key word field of the first entry, and
provide, to the user device, a search result identifying a first media content corresponding to the first entry.

8. The system of claim 7, wherein when identifying key words or terms, the at least one processor is configured to:
identify a predetermined number of frequently used words or terms associated with descriptions of media content having the first genre.

9. The system of claim 8, wherein the first genre comprises one of an adult genre, a horror genre, a violence genre or a children's genre.

10. The system of claim 7, wherein when providing a search result, the at least one processor is configured to:
order the search result identifying the first media content higher in a listing of search results than ones of the search results identifying media content not having information stored in the key word field.

11. The system of claim 7, wherein the at least one processor is further configured to:
receive, from the user device, a second search query,
determine at least one of a time of day or a day of the week in which the second search query was received,
search the database for an entry in which at least one word or term in the second search query matches the metadata associated with the media content, and
not check the key word field of the first entry based on at least one of the time of day or the day of the week.

12. The system of claim 7, wherein the at least one processor is further configured to:
receive a second search query,
identify multiple entries in the database based on the second search query, the multiple entries including a second entry,
determine whether a genre associated with the second entry matches a genre associated with at least an other one of the multiple entries, and
provide a second search result that does not include the second entry, in response to determining that a genre associated with the second entry does not match a genre associated with at least the other one of the multiple entries.

13. A non-transitory computer-readable medium having stored thereon sequences of instructions which, when executed by at least one processor, cause the at least one processor to:
  receive a search query associated with identifying media content provided by a service provider;
  access a table including a plurality of entries storing metadata associated with a plurality of media content, wherein at least some of the plurality of entries include a key word field storing key words or terms frequently used to describe media content and wherein the key words or terms are used to disassociate words in the metadata from words in search queries;
  identify key words or terms in a description portion of the metadata for multiple entries in the table having a first genre;
  store the identified key words or terms in the key word field for the multiple entries having the first genre;
  identify a first entry in the table based on a word or term in the search query matching metadata stored in the first entry;
  determine whether at least one word in the search query is included in a key word field of the first entry; and
  one of:
    provide a search result identifying the media content corresponding to the first entry, in response to determining that at least one word in the search query is included in the key word field; or
    provide a search result that does not identify the media content corresponding to the first entry, in response to determining that no words in the search query are included in the key word field.

14. The non-transitory computer-readable medium of claim 13, wherein when identifying key words or terms, the instructions cause the at least one processor to:
  identify a predetermined number of frequently used words or terms associated with descriptions of media content having the first genre.

15. The non-transitory computer-readable medium of claim 14, wherein the first genre comprises one of an adult genre, a horror genre, a violence genre or a children's genre.

16. The non-transitory computer-readable medium of claim 13, wherein when providing a search result, the instructions cause the at least one processor to:
  identify multiple entries in the table based on a word or term in the search query matching metadata stored in each of the multiple entries, the multiple entries including a second entry,
  determine whether a genre associated with the second entry matches a genre associated with at least an other one of the multiple entries, and
  provide the search result that does not include the second entry, in response to determining that a genre associated with the second entry does not match a genre associated with at least the other one of the multiple entries.

17. The method of claim 1, wherein providing the search result comprises:
  ordering the search result identifying the first media content higher in a listing of search results than ones of the search results identifying media content not having information stored in the key word field.

18. The system of claim 12, wherein when determining whether a genre associated with the second entry matches a genre associated with at least an other one of the multiple entries, the at least one processor is configured to:
  determine whether the genre associated with the second entry matches a genre associated with at least a threshold number or threshold percentage of the multiple entries, and
  wherein when providing the second search result, the at least one processor is configured to provide the second search that does not include the second entry, in response to determining that the genre associated with the second entry does not match the genre associated with at least the threshold number or threshold percentage of the multiple entries.

19. The non-transitory computer-readable medium of claim 13, further including instructions for causing the at least one processor to:
  receive a second search query;
  determine at least one of a time of day or a day of the week in which the second search query was received;
  identify a second entry in the table based on a word or in the second search query matching metadata stored in the second entry; and
  not check the key word field of the second entry based on at least one of the time of day or the day of the week.

20. The non-transitory computer-readable medium of claim 16, wherein when determining whether a genre associated with the second entry matches a genre associated with at least an other one of the multiple entries, the instructions cause the at least one processor to:
  determine whether the genre associated with the second entry matches a genre associated with a threshold number or threshold percentage of the multiple entries, and
  wherein when providing the search result, the instructions cause the at least one processor to provide the search result that does not include the second entry, in response to determining that the genre associated with the second entry does not match the genre associated with the threshold number or threshold percentage of the multiple entries.

* * * * *